(12) United States Patent
Sherman et al.

(10) Patent No.: US 6,450,371 B1
(45) Date of Patent: Sep. 17, 2002

(54) DEVICE FOR MEASURING, DISPENSING AND STORING OF GRANULAR AND POWDER MATERIALS

(76) Inventors: Yury Sherman, 511 Beech St., Roslindale, MA (US) 02131-4904; Ilya Eskin, 64 Potomac St., West Roxbury, MA (US) 02132

( * ) Notice: Subject to any disclaimer, the term of this patent is extended or adjusted under 35 U.S.C. 154(b) by 0 days.

(21) Appl. No.: 10/054,020

(22) Filed: Jan. 24, 2002

(51) Int. Cl.⁷ .............................................. G01F 11/10
(52) U.S. Cl. ...................................... 222/361; 222/336
(58) Field of Search ............................. 222/181, 336, 222/361, 325, 366, 461, 561

(56) References Cited

U.S. PATENT DOCUMENTS

| | | | |
|---|---|---|---|
| 1,455,970 A | | 5/1923 | Resek |
| 1,471,621 A | | 10/1923 | McCord |
| 1,904,756 A | | 4/1933 | Wooster |
| 2,683,554 A | * | 7/1954 | Mulhauser, Jr. ............. 222/336 |
| 3,072,299 A | | 1/1963 | Sessions et al. |
| 3,185,190 A | | 5/1965 | Crawford |
| 3,193,159 A | | 7/1965 | Swindler |
| 4,394,941 A | * | 7/1983 | Recine ........................ 222/361 |
| 4,531,658 A | * | 7/1985 | Galopin ...................... 222/361 |
| 5,421,491 A | | 6/1995 | Tuvim et al. |

* cited by examiner

*Primary Examiner*—Lesley D. Morris
*Assistant Examiner*—Thach H. Bui
(74) *Attorney, Agent, or Firm*—John H. Crozier (57) ABSTRACT

The present invention achieves the above objects, among others, by providing, in a preferred embodiment, a hand-operated device for measuring, dispensing and storing of powder and granular materials, having filling and discharging/storing positions, comprising: a container wherein the material is stored and a measuring and dispensing unit attached to the container. The unit includes: a housing having interconnected material receiving and material discharging openings; a slide moveable back and forth inside the passageway, delivers the material from the receiving opening to the discharging opening, accommodating a predetermined volume of the material dispensed by the device in one stroke; a compression spring located between the slide and the housing, being compressed when the slide is moved inside the housing during its working stroke, the spring returns the slide in its original position after being realesed; a retaining apparatus holdind the slide inside the housing in its discharging position when the device is not in use, a stoppering apparatus fixing filling position of the slide; and a apparatus providing airtight closing of the ways of possible penetration of air from the container to outside atmosphere or back.

21 Claims, 6 Drawing Sheets

DEVICE FOR MEASURING, DISPENSING AND STORING OF GRANULAR AND POWDER MATERIALS

FIELD OF THE INVENTION

The present invention relates to a household hand-operated device for measuring, dispensing and storing of powder and granular materials such as instant and ground coffee, baby formula, dried milk, non-dairy creamer, sugar, flour, detergents and the like. More particularly, it relates to device for measuring, dispensing and storing of the predetermined volume of powder or granular material from a special container or from a container in which the materials are normally sold or stored.

BACKGROUND OF THE INVENTION

Various types of devices, combining storing and (or-only) measuring and dispensing functions for powder and granular materials have been developed in the past. Examples include U.S. Pat. No. 1,455,970 to Resek; U.S. Pat. No. 1,471,621 to McCord; U.S. Pat. No. 1,904,756 to Wooster; U.S. Pat. No. 3,072,299 to Sessions et al.; U.S. Pat. No. 3,185,190 to Crawford; U.S. Pat. No. 3,193,159 to Swindler, U.S. Pat. No. 5,421,491 to Tuvim et al.

Most of the prior art devices for storing, measuring and dispensing powder and granular materials have some or all of the following drawbacks:

- necessity to pour powder and granular materials to be dispensed from a container in which these materials are normally sold into a special container;
- complexity of dismantling and reassembling of the device for washing and cleaning;
- inconvenience in operation, especially for elderly and handicapped people.

These drawbacks were avoided in the device described in the U.S. Pat. No. 5,421,491, however even this device, as well as all others in the prior art, does not actually provide airtight conditions for storing the materials. As a result, humidity inside the container is uncontrollable, sometimes during several weeks or even more of storage. If the humidity is high, hygroscopic materials such as instant coffee, flour, sugar, salt, etc. stored in the container, become caked and quickly deteriorate. In case of a coffee dispenser, coffee freshness steadily declines during its storage and dispensing because of losing aroma, even at low air humidity. This drawback is especially serious for areas of high humidity climate where the prior art devices are completely impractical.

Another drawback of the device described in the U.S. Pat. No. 5,421,491, as well as other earlier developed structures based on a hand-operated plunger-type dispensers, is that placing a container with attached dispensing device requires additional space on a shelf or a kitchen table. This drawback is caused by a slide extended from the device's contour. The extended slide also undesirably affects the esthetic characteristics of the device.

To provide airtight conditions for stored materials while providing for measured dispensing of the materials is the main object of the present invention.

It is further object of the invention is to provide compact, monolith-like shape of the device during storage of the material.

Still another object of the invention is to provide improved quality of esthetic design of the dispensers.

Other objects of the present invention, as well as particular features, elements and advantages thereof, will be elucidated in, or be apparent from, the following description and the accompanying drawing figures.

SUMMARY OF THE INVENTION

The present invention achieves the above objects, among others, by providing, in a preferred embodiment, a hand-operated device for measuring, dispensing and storing of powder and granular materials, having filling and discharging/storing positions, comprising: a container wherein the material is stored and a measuring and dispensing unit attached to the container. The unit includes: a housing having interconnected material receiving and material discharging openings; a slide moveable back and forth inside said passageway, delivers the material from the receiving opening to the discharging opening, accommodating a predetermined volume of the material dispensed by the device in one stroke; a compression spring located between the slide and the housing, being compressed when the slide is moved inside the housing during its working stroke, the spring returns the slide in its original position after being released; a retaining means holding said slide inside the housing in its discharging position when the device is not in use, a stoppering means fixing filling position of the slide; and a means providing airtight closing of the ways of possible penetration of air from the container to outside atmosphere or back.

DESCRIPTION OF THE DRAWINGS

Understanding of the present invention and the various aspects thereof will be facilitated by reference to the accompanying drawing figures, provided for purpose of illustration only and not intended to define the scope of the invention, on which:

FIGS. 2 are fragmentary, side elevation views showing types of coupling of a container and a measuring and dispensing unit: (A) the container's neck and the unit are coupled by threads, (B) the container and the unit are coupled by using an adapter; and (C) the container and the unit are coupled by embracing means.

DETAILED DESCRIPTION OF THE PREFERRED EMBODIMENT

Reference should now be made to the drawing figures on which similar or identical elements are given consistent identifying numerals throughout the various figures, and on which parenthetical references to figure numbers direct the reader to the view(s) on which the element(s) being described is (are) best seen, although the element(s) may be seen on other figures also.

Referring to the drawings in detail, in FIGS. 1–9 a device for storing, measuring and dispensing of powder and granular materials is shown in preferred embodiments.

Figure 1:
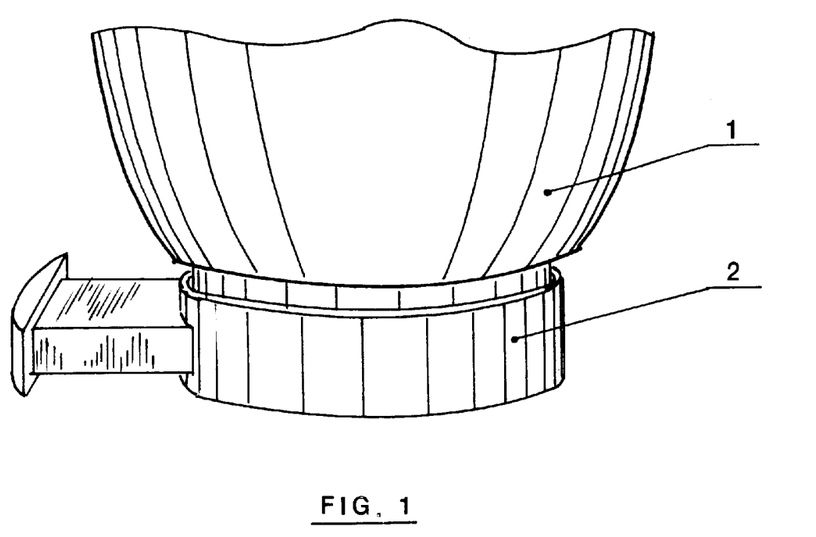
FIG. 1 is a fragmentary, side elevation view of a dispenser of the present invention.
Figure 2:
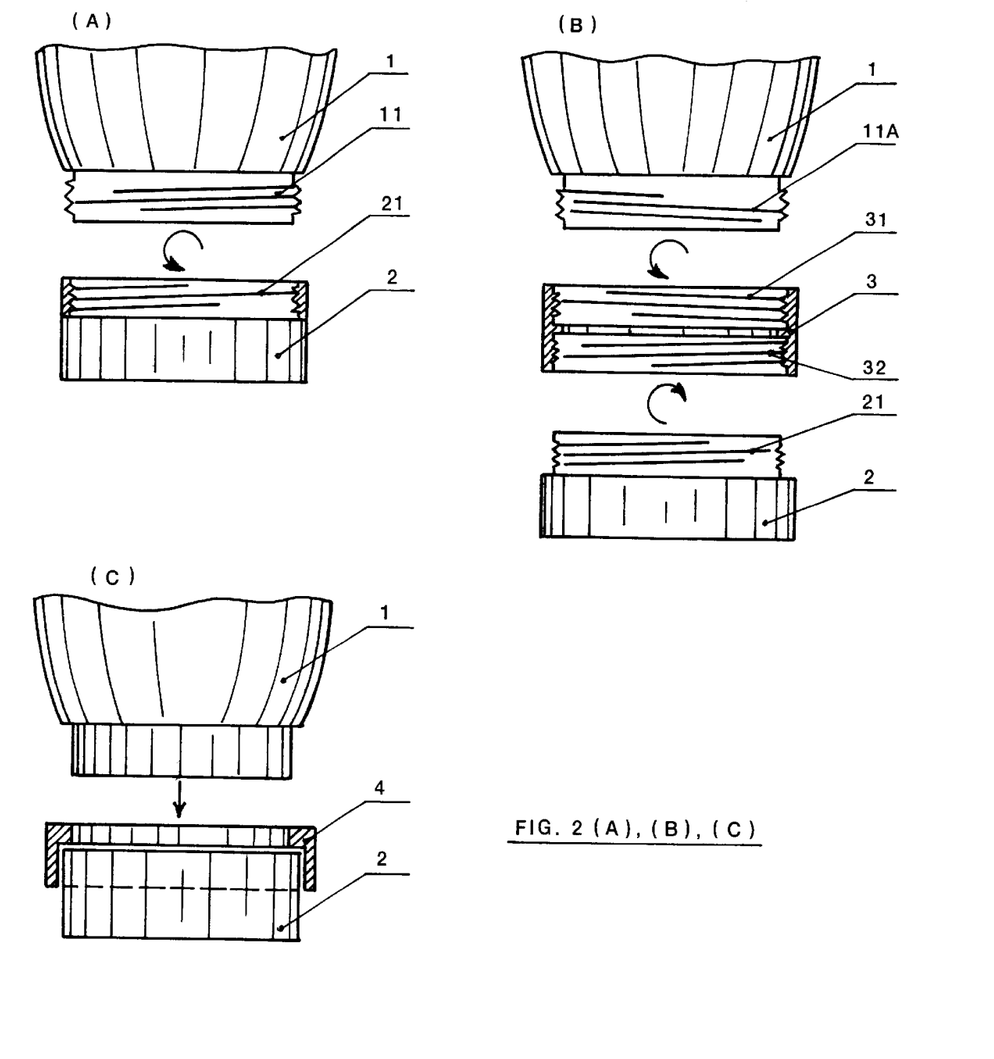

The device consists of two main parts (FIG. 1): container 1 wherein the material is stored, and measuring and dispensing unit 2 attached to the container. Three main versions of coupling of container 1 with unit 2 are shown:

FIG. 2 (A)—container 1 has threaded neck 11 and unit 2 has threaded skirt 21 that matches the thread at the neck; then unit 2 could be screwed onto container 1;

FIG. 2 (B)—container 1 has a threaded neck 11A and unit 2 has a threaded skirt 21 that does not match the neck's tread; in this case an adapter 3 which can be coupled with the container and the unit by threads 31 and 32 is used; and FIG. 2 (C)—a neck of container 1 does not have a thread; in this case attaching means 4 capable fixedly attached to unit 2, for example, by embracing of the neck of container 1.

Further description of the preferred embodiment of the device will be made with reference to the arrangement shown in FIG. 2 (A).

Figure 3:
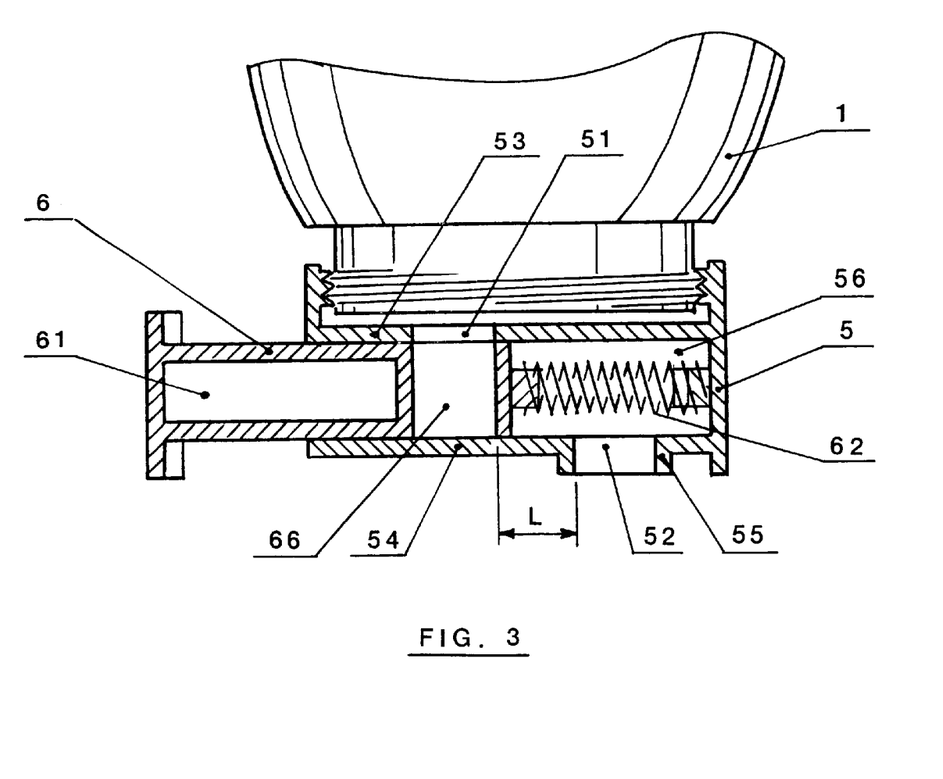
FIG. 3 is a fragmentary, side elevation view, partially in cross section, of the device in its filling position, stoppering means is not shown.

Referring now to FIG. 3, unit 2 comprises: a housing, a transporting mechanism, and a retaining means.

Housing 5 includes material receiving opening 51 and material discharging opening 52, FIG. 3. Opening 51 is located in inner wall 53 of the housing facing toward container 1. Opening 52 is located in wall 54 of the housing facing outside. The openings 51 and 52 are interconnected by a lateral passageway 56 capable to accommodate the transporting mechanism 6. Opening 52 has an extended nozzle 55 through which the material is dispensed.

Figure 4A:
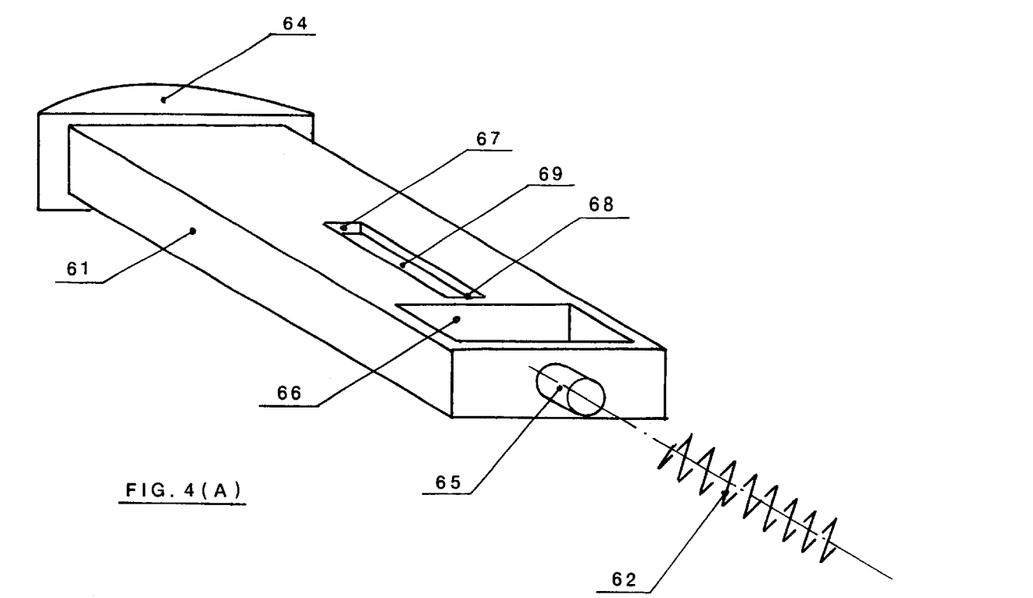
FIG. 4A shows an isometric view of the slide.
Figure 4B:
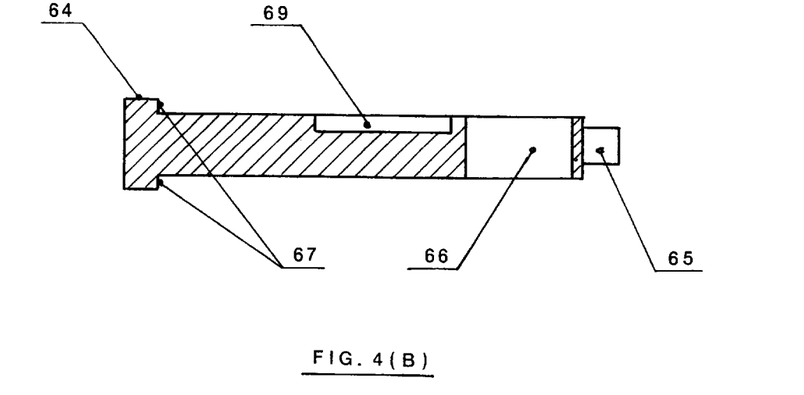
FIG. 4B shows a cross section view of the slide.

Transporting mechanism 6 of the device is shown in FIGS. 4A and 4B The mechanism's main function is delivery of the material from material receiving opening 51 to material discharging opening 52. The mechanism consists of slide 61 and spring 62.

The slide is inserted into passageway 56 of the housing and is moveable back and forth along the passageway. It includes an opening 66, which, in combination with walls 53 and 54 of the housing, defines a moveable compartment capable to receive a predetermined volume of the material delivered by the dispenser in one stroke. Cross sectional sizes and shape of the opening 66 are substantially the same as of openings 51 and 52. Opening 66 is located such that it can be registered with openings 51 and 52 in the housing when the slide is moved along passageway 56. In registered position with opening 51 (FIG. 3), opening 66 is filled with the material. In registered position with opening 52, the material is dispensed. To prevent inaccurate measuring of the material, openings 51 and 52 should not have an interconnection when the slide moves along passageway 56. For this purpose a distance "L" (FIG. 3) between openings 51 and 52 should be substantially equal to a width of the opening 66.

To return the slide into its filling position after the material is dispensed, compression spring 62 is placed between the slide and the housing, FIG. 3. Extension 65 supports spring 62. The slide has handle 64.

To prevent full withdrawal of slide 61 from passageway 56 at its backward movement after the material is dispensed, and to fix registered interposition of openings 51 and 66 when opening 66 is being filled with the material, unit 2 includes a stoppering means as is described below.

Figure 5:
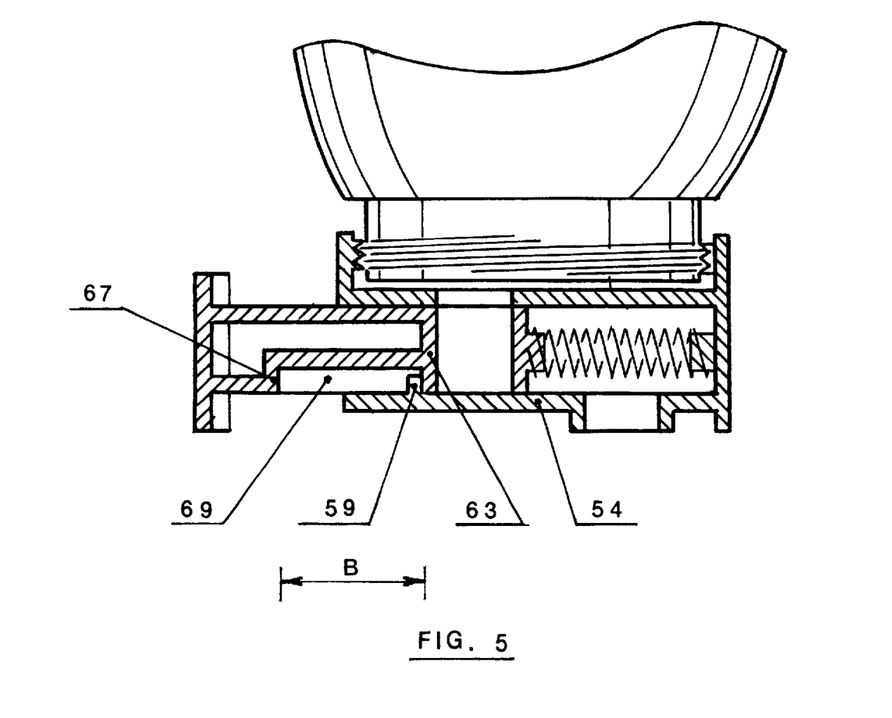
FIG. 5 is a fragmentary, side elevation view, partially in cross section, of the device having an extended pin and a groove as a stoppering means.

In the preferred embodiment shown, the stoppering means consists of a groove 69 in the slide and pin 59 extending from wall 54 of the housing (FIGS. 4 and 5). Length "B" of the groove is equal to a working stroke o and is inserted into the groove. The width and the depth of the groove provide freely movement of the pin inside the groove when the slide moves along the passageway 56. The interposition of the pin and the groove must provide engagement of pin 59 against wall 67 at the end of the working stroke of the slide (when opening 66 registers opening 52), and engagement of pin 59 against wall 63 at the end of the backward movement of the slide (when opening 66 registers opening 51). As it is described, insertion of pin into the passageway provides the working stroke of the slide. In order to permit assembly of housing 5 and slide 61 and to permit rapid dismantling and reassembly of unit 2 for washing and cleaning, pin 59 should be moveable perpendicularly to wall 54. If the pin is removed from the passageway, the slide is pressed out of the passageway by spring 62. Then the slide and the housing are ready for washing and cleaning. For reassembly this procedure is done in the reverse order. The stoppering means can be of different structures, for example as it is described in the U.S. Pat. 5,421,491.

Figure 6:
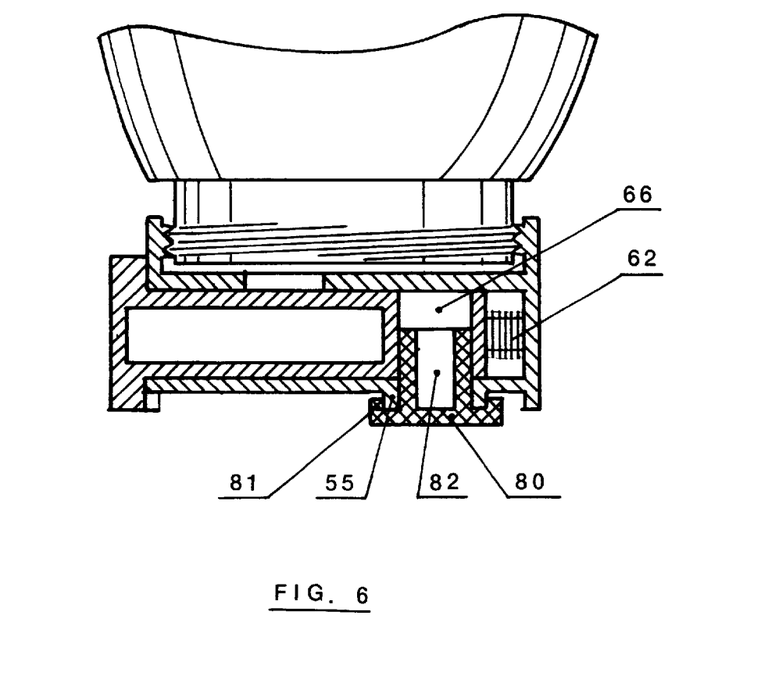
FIG. 6 is a fragmentary, side elevation view, partially in cross section, of the device with a plug retaining means, stoppering means is not shown.

In order to reduce space required for placing the device, as well as to improve the device appearance, the slide should be retained inside the housing when the device is not in use. For this purpose the device includes a retaining means. As it is shown in FIG. 6, the retaining means is a removable plug 80, inserted in opening 66 of the slide through nozzle 55 and opening 52, when the slide is placed into discharging position. Extension 82 of the plug prevents backward movement of the slide under the force generated by spring 62. Cap 81 of the plug is used as a cover for nozzle 55.

Figure 7:
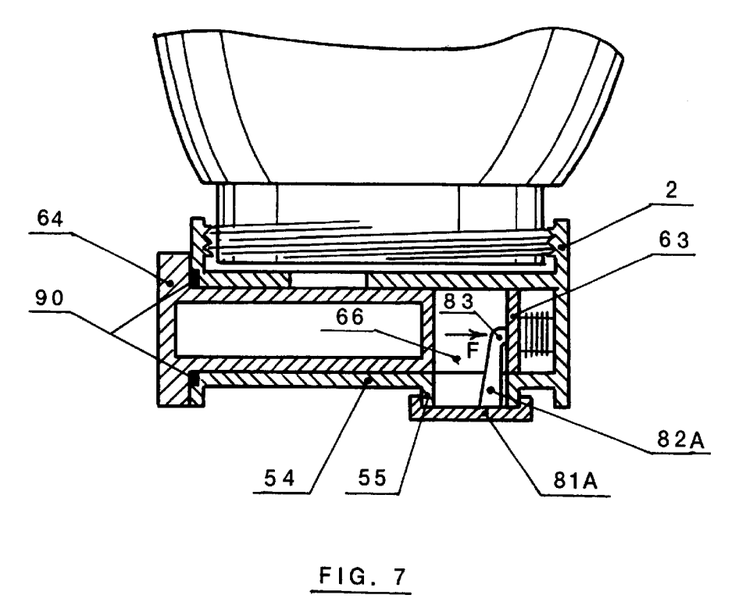
FIG. 7 is a fragmentary, side elevation view, partially in cross section, of the device with an airtight plug retaining means, stoppering means is not shown.

For airtight closing of unit 2, a modified retaining structure is used. The retaining structure consists of an airtight cap 81A and a cantilever extension 82A having pin 83 (FIG. 7). When cap 81A is put on the neck 55, pin 83 of the extension engages against wall 63 of the slide that generates elastic force "F" in the cantilever. Force "F" pushes slide 61 inside the housing and thus, clasps the slide's handle 64 to the housing. To make a reliable airtight closing of the open end of the passageway, sealing means 90 are placed between the slide's handle and the housing.

Figure 8:
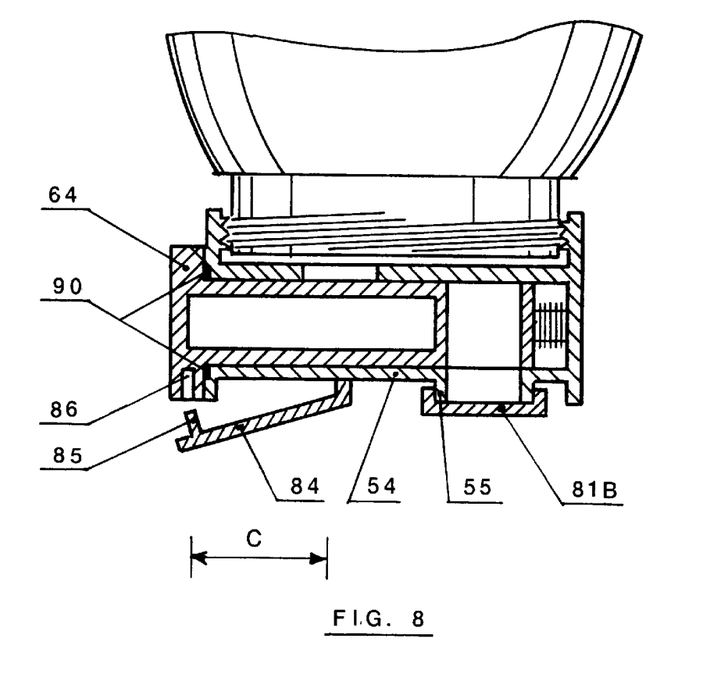
FIG. 8 is a fragmentary, side elevation view, partially in cross section, showing the device with an airtight cantilever retaining means, stoppering means is not shown.

A version of the airtight closing of the unit 2 is shown in FIG. 8. An airtight cap 81B closes nozzle 55. For closing the open end of the passageway, latch 84 with pin 85 is fixedly attached to and cantilevered from wall 54 of the housing. The slide's handle 64 includes hole 86 capable to receive pin 85. Length "C" of cantilever 84 provides generation of the tensile force in the cantilever when pin 85 is inserted into hole 86. This force, being transmitted to the slide, clasps handle 64 to the housing. Sealing means 90 are placed as it is described above.

Figure 9:
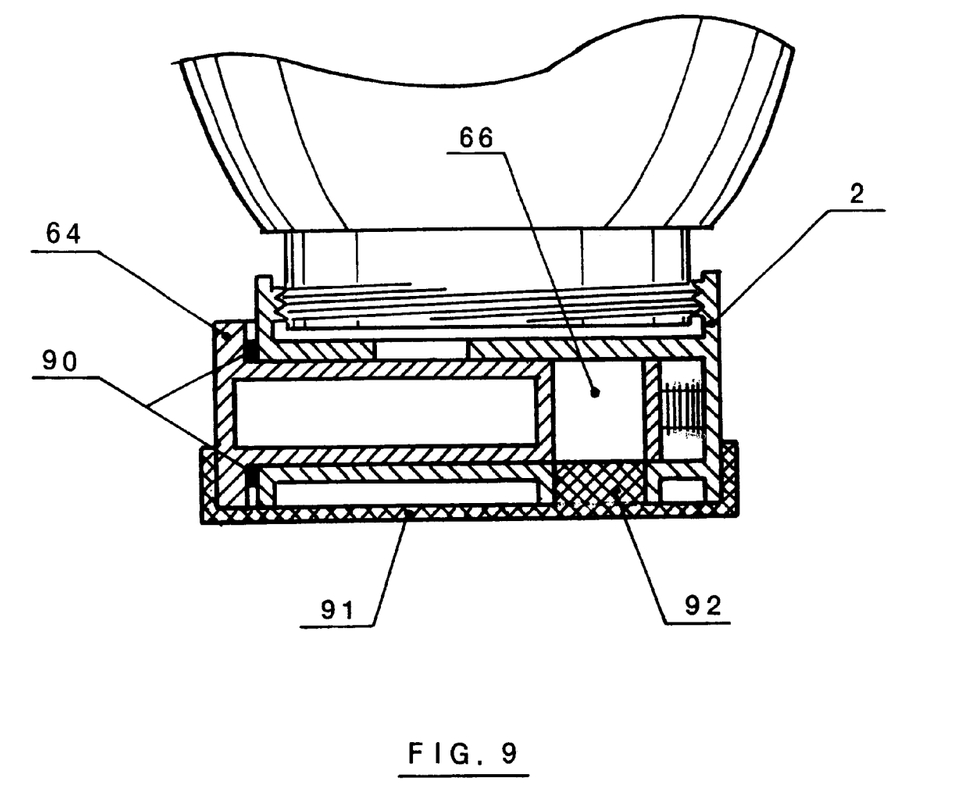
FIG. 9 is a fragmentary, side elevation view, partially in cross section, of an alternative embodiment of an airtight container, stoppering means is not shown.

Still another version of airtight closing of the unit 2 is shown in FIG. 9. Lid 91 of elastic material tightly frictionally embraces housing 5. Being a retaining means that keeps the slide in its discharging position, rim 92 of the lid, due to elastic force generated when the lid is placed upon the housing, pushes handle 64 of the slide toward the housing. Sealing means 90 are placed as it is described above. Lid 91 has an extension 93 that is a plug for nozzle 55 providing airtight closing of the nozzle. By this way, when the lid is placed upon unit 2, airtight closure of the unit is provided.

The elements of unit 2, other then spring 62, can be conveniently constructed from injection molding of polyethylene or any other proper material.

In order to operate the device starting from its storing position, the retaining means of the unit 2 (FIGS. 6–9) is removed. The slide becomes released and under the spring force moves out from its discharging to its filling position. Then container 1 is turned over. In this position, the material pours into opening 66 and fills the compartment formed by walls of the housing and opening 66. The user pushes handle 64 of the slide inside housing 5 as far as the slide can go. In this position opening 66 registers with the discharging opening 52 and content of the compartment pours through nozzle 55 into the receiving vessel (not shown). After that the user releases the slide's handle and the slide returns into its filling position. If necessary, filling-discharging procedures are repeated several times. When the dispensing operation is over, the user should push the slide into discharging position, activate the retaining means and turn over the device into its original (storing) position.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown in the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

We claim:

1. A hand-operated device for measuring, dispensing and storing of powder and granular materials, having filling and discharging positions, comprising:
   (a) a container wherein the material is stored;
   (b) a measuring and dispensing unit attached to the container;
   (c) said unit including a housing, a transporting mechanism, and a retaining means;
   (d) said housing having at least two substantially parallel walls: one directed to said container, including a material receiving opening, and the other directed outside, including a material discharging opening, said openings being interconnected by a lateral passageway accommodating said transporting mechanism;
   (e) said transporting mechanism including a slide moveable back and forth inside said passageway and at least one compression spring;
   (f) said slide including a handle and an opening capable to accommodate a predetermined value of the material dispensed by the device in one stroke, delivering the material from said receiving opening to said discharging opening;
   (g) said spring being located between said slide and said housing, being compressed when the slide moves inside said housing due to outside force applied to the slide and returns into its original position after said outside force is released,
   (h) said retaining means holding said transporting mechanism in its discharging position when said unit is not in use, capable to provide airtight contact between said slide and said housing.

2. A device according to claim 1, wherein: said container has a threaded neck.

3. A device according to claim 1, wherein: said container has other than a threaded neck.

4. A device according to claim 2, wherein: said housing has a threaded skirt for coupling said container's neck.

5. A device according to claim 4, further comprising an adapter, capable to receive said skirt of the unit and said container's neck.

6. A device according to claim 3, wherein: said unit includes also a means capable to embrace tightly said container.

7. A device according to claim 1, further comprising means preventing complete withdrawal of said slide from said housing when the slide is being pressed out of the housing due to elastic force generated by said spring.

8. A device according to claim 1, wherein: said opening capable to accommodate a fixed value of said material registers with the discharging opening of said housing when said slide takes said discharging position.

9. A device according to claim 1, wherein: said discharging opening of said housing has a nozzle extended outside said housing.

10. A device according to claim 9, wherein: the retaining means is a removable cap capable to receive said nozzle, having an extension with length permitting an insertion of said extension into said discharging opening in said slide when the slide is placed in its discharging position and said cap is put upon the nozzle, contacting at least one slide's wall and thereby, retaining said slide in discharging position.

11. A device according to claim 9, wherein: said device includes a removable cap providing airtight closing of said nozzle.

12. A device according to claim 11, wherein: said retaining means includes an extension from said housing, having a pin at its distal end, a handle of said slide includes a hole capable to receive said pin; interposition and sizes of said pin and said hole provide a male/female connected position and generation of permanent tension in the extension when said slide is placed in its discharging position, said tension pushes said slide inside the housing and clasps the handle of said slide to said housing at an open end of said passageway.

13. A device according to claim 12, wherein: an elastic sealing means is placed between said handle of said slide and said housing.

14. A device according to claim 13, wherein: said permanent tension is strong enough to make airtight a contacting surface between said handle of said slide and said housing.

15. A device according to claim 9, wherein: said retaining means is a removable cap capable to provide airtight closing of said nozzle, having an extension with a pin at its tip, length of the extension permitting insertion of said extension into said discharging opening in said slide when said slide is placed in its discharging position and said cap is put upon said nozzle.

16. A device according to claim 15, wherein: said pin engages against a wall of said slide when said extension is inserted into said receiving opening, that generates a permanent elastic force applied to said slide from said extension and pushes said slide inside said housing.

17. A device according to claim 16, wherein: an elastic sealing means is placed between said handle of said slide and said housing.

18. A device according to claim 17, wherein: said permanent elastic force is strong enough to make airtight a contacting surface between said handle of said slide and said housing.

19. A device according to claim 11, wherein: said retaining means is a lid having a rim tightly embracing said housing when said slide is in said discharging position and said lid is placed upon said nozzle, generating elastic force in said rim that pushes said handle of the slide toward said housing, having an extension that is an airtight plug for said nozzle.

20. A device according to claim 19, wherein: an elastic sealing means is placed between said handle of said slide and said housing.

21. A device according to claim 20, wherein: an elastic sealing means is placed between said handle of said slide and said housing.

* * * * *